UNITED STATES PATENT OFFICE.

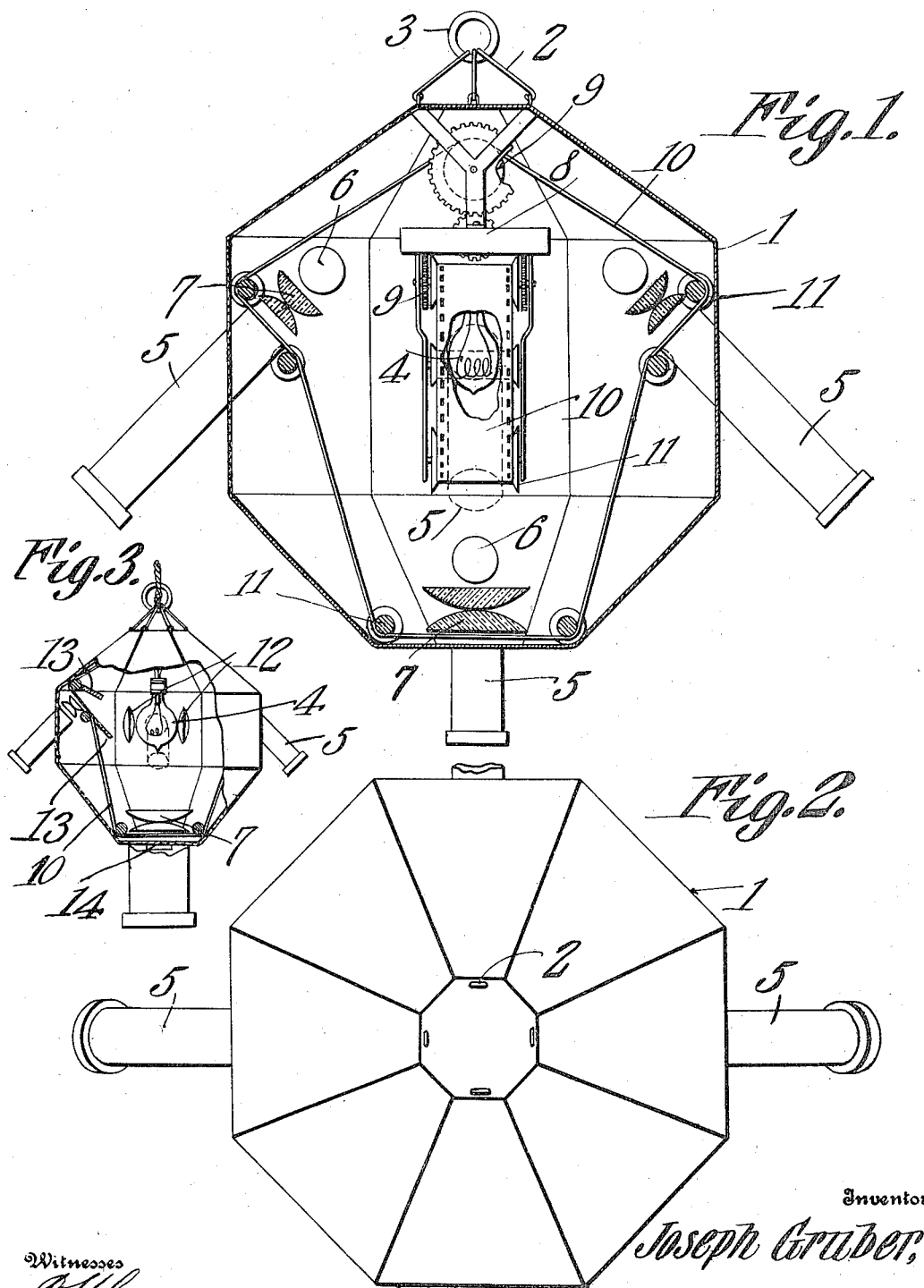

JOSEPH GRUBER, OF TAMPA, FLORIDA.

ADVERTISING DEVICE.

989,598. Specification of Letters Patent. Patented Apr. 18, 1911.

Application filed February 23, 1910. Serial No. 545,518.

*To all whom it may concern:*

Be it known that I, JOSEPH GRUBER, a citizen of the United States, residing at Tampa, in the county of Hillsboro and State of Florida, have invented a new and useful Advertising Device, of which the following is a specification.

This invention has reference to improvements in advertising devices and its object is to provide a device for the purpose which may be mounted in an elevated position so as to throw images of advertisements upon a lower plane as for instance the surface of a street to attract the attention of passers by and provision is made for causing the advertising matter to change so as to attract more attention than would be the case were the same advertising displays maintained for long periods of time.

The invention will be best understood from a consideration of the following detail description taken in connection with the accompanying drawings forming a part of this specification, in which drawings, Figure 1 is a central section through the advertising device with some parts shown in elevation. Fig. 2 is a plan view of the device. Fig. 3 is a central section partly in elevation of a somewhat different form of the device than that shown in Fig. 1.

Referring to the drawings there is shown a casing 1, which may be hexagonal in cross section as shown in the drawings or any other shape desired, and the ends of this casing may be frusto-pyramidal or otherwise shaped as desired.

One end of the casing is provided with a suspension device in the form of links 2 joined to a ring 3 by means of which the casing may be suspended from any overhead support at any desired distance from the surface of the street, especially at the intersections of streets.

Within the casing and preferably at the center thereof there is a light source illustratively indicated by an incandescent electric lamp 4, but it will be understood that any other suitable source of light may be used.

At appropriate points around the casing these are situated downwardly inclined projecting devices 5 and another such projecting device may be provided at the bottom of the lower end of the casing with its longitudinal axis perpendicular to the plane of the street pavement.

The lamp 4 may be made to supply two or more projecting devices 5 as in Fig. 3, or certain of the projectors 5 may have individual light sources 6 as indicated in Fig. 1.

The projecting devices 5 may include projecting lenses of suitable focus such as are commonly found on the market, and condensing lenses 7 of usual form may be associated with the projectors 5.

Housed within the casing 1 is a motor, preferably a spring motor, but not precluding an electric motor, and such motor is illustratively shown at 8, details being omitted since the structure of the motor forms no part of the present invention. This motor is made to drive drums 9 for the actuation of endless films 10 carrying suitable advertising matter. These films in the form of endless bands are carried around appropriate idler rollers 11 to direct them in proper relation to the projectors 5.

When the projectors are out of the same vertical plane then more than one advertising band 10 must be employed.

In the structure shown in Fig. 1 a single endless band 10 driven by the motor 8 is made to pass in operative relation to three projectors 5, one of the projectors pointing directly downward from a central point at the bottom of the casing 1 and another band 10 is made to pass by projectors 5 at right angles to others of the projectors. By this means two bands 10 are made to supply five projectors with appropriate views or advertising matter carried by the bands 10, which latter may be in the form of films similar to those used in connection with motion picture machines.

At night time the motor 8 may be caused to operate and the bands 10 will then move progressively past the projectors and the light sources 5 and 6 or any of them being energized will cause the display of the matter contained on the bands 10 through the appropriate projectors on to the street surface so that passers by may see such display and be attracted thereby.

The motor 8 may cause the film bands to move progressively or may be made to cause these films to move intermittently, and in either instance the advertising matter will be caused to be projected so as to show upon the pavement, the projecting devices 5 being properly adjusted for this purpose.

Instead of having a separate light source for each projector, or for less than the whole number of projectors, a single light source may answer for all the projectors by employing an arrangement such as illustrated in Fig. 3.

A beam of light individual to each projector out of line with the light source 4 of Fig. 3 is formed by a suitable lens 12 and the path of this beam may be divided by mirrors 13 until it is axial to the desired projector and by interposing at the projector either a film 10 or a single transparent plate or film carrying the matter to be projected, such matter in line with the projector will be displayed upon the pavement or plane surface upon which it is desirable to display the image.

Instead of employing the film 10 for the vertical projector a clock indicated at 14 may be employed for displaying the time upon the pavement immediately below the projecting device or any other attractive display which need not be of advertising character may replace the clock movement. Such a display will attract attention because of its useful or curious character.

What is claimed is:—

1. An advertising device comprising a casing adapted to be suspended above the street, means within the casing for the production of light, a plurality of projecting lenses directed toward the street surface at different points thereon, a continuous film for each group of projecting lenses having their longitudinal axis in the same plane, and means within the casing for imparting motion to said films.

2. An advertising device comprising a casing adapted to be suspended above the street, means therein for the production of light, a plurality of projecting lenses directed toward the street surface at different points thereon, a continuous film for each group of projecting lenses having their longitudinal axis in the same plane, and means within the casing for imparting motion to all the films simultaneously.

3. An advertising device comprising a suitable casing adapted to be suspended above the surface of the street, means therein for the production of light, a projecting lens carried by the casing and directed downward perpendicular to the surface of the street, other projecting lenses divergent one to the other and directed at an angle toward the surface of the street, continuous films within the casing each common to a group of projecting lenses having their longitudinal axes in the same plane and means within the casing for actuating the films.

In testimony that I claim the foregoing as my own, I have hereto affixed my signature in the presence of two witnesses.

JOSEPH GRUBER.

Witnesses:
 GUSTAVE SCHWARTZ.
 I. H. SCHWARTZ.